United States Patent
Hyakusawa (12)

(10) Patent No.: US 11,231,708 B2
(45) Date of Patent: Jan. 25, 2022

(54) DISPLAY CONTROL APPARATUS, DISPLAY CONTROL METHOD, AND STORAGE MEDIUM

(71) Applicant: HONDA MOTOR CO., LTD., Tokyo (JP)

(72) Inventor: Dai Hyakusawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 316 days.

(21) Appl. No.: 16/553,629

(22) Filed: Aug. 28, 2019

(65) Prior Publication Data

US 2019/0384287 A1    Dec. 19, 2019

Related U.S. Application Data

(63) Continuation of application No. PCT/JP2017/008449, filed on Mar. 3, 2017.

(51) Int. Cl.
  *G05D 1/00* (2006.01)
  *H04W 4/40* (2018.01)
  (Continued)

(52) U.S. Cl.
  CPC ......... *G05D 1/0044* (2013.01); *A01D 34/008* (2013.01); *G06F 3/04845* (2013.01);
  (Continued)

(58) Field of Classification Search
  CPC ........ G05D 1/0044; G05D 2201/0208; H04W 4/40; A01D 34/008; A01D 2101/00;
  (Continued)

(56) References Cited

U.S. PATENT DOCUMENTS

| 10,222,797 B2 * | 3/2019 | Yamamura | G05D 1/0278 |
| 2012/0083961 A1 * | 4/2012 | Sato | G05D 1/027 |
| | | | 701/25 |

(Continued)

FOREIGN PATENT DOCUMENTS

| CN | 20498809 U | * | 1/2016 |
| CN | 204948759 U | * | 1/2016 |

(Continued)

OTHER PUBLICATIONS

Office Action dated Sep. 18, 2020, issued in counterpart JP Application No. 2019-502406, with partial English Translation. (5 pages).

(Continued)

*Primary Examiner* — Muhammad Shafi
(74) *Attorney, Agent, or Firm* — Westerman, Hattori, Daniels & Adrian, LLP

(57) ABSTRACT

A non-transitory storage medium storing a program is provided. The program includes instructions for causing, when executed by at least one processor, the at least one processor to execute: acquiring a state of an automatic working machine; displaying an image illustrating the automatic working machine in a display apparatus in a size in accordance with the state; and causing the display apparatus to display, with the image, an interface for controlling a start of a work of the automatic working machine.

9 Claims, 13 Drawing Sheets

(51) Int. Cl.
  *A01D 34/00* (2006.01)
  *G06F 3/0484* (2013.01)
  *G07C 5/00* (2006.01)
  *A01D 101/00* (2006.01)

(52) U.S. Cl.
  CPC .............. *G07C 5/008* (2013.01); *H04W 4/40* (2018.02); *A01D 2101/00* (2013.01); *G05D 2201/0208* (2013.01)

(58) Field of Classification Search
  CPC .. G06F 3/04845; G06F 3/1423; G06F 3/1454; G06F 3/147; G06F 3/14; G07C 5/008; G09G 2380/06; G09G 2370/16
  USPC ............................................................ 701/2
  See application file for complete search history.

(56) References Cited

U.S. PATENT DOCUMENTS

| | | | | |
|---|---|---|---|---|
| 2015/0128547 | A1* | 5/2015 | Einecke | G05D 1/0038 56/10.2 A |
| 2015/0163993 | A1* | 6/2015 | Pettersson | A01D 34/008 701/28 |
| 2015/0296707 | A1* | 10/2015 | Fukuda | B60L 15/20 701/25 |
| 2016/0041803 | A1 | 2/2016 | Markov et al. | |
| 2016/0174459 | A1* | 6/2016 | Balutis | G05D 1/0234 701/25 |
| 2017/0020064 | A1* | 1/2017 | Doughty | A01D 34/008 |

FOREIGN PATENT DOCUMENTS

| | | |
|---|---|---|
| JP | 2001-265558 A | 9/2001 |
| JP | 2013-52962 A | 3/2013 |
| JP | 2016-186748 A | 10/2016 |
| WO | 2016/178616 A1 | 11/2016 |

OTHER PUBLICATIONS

Extended (Supplementary) European Search Report dated Jan. 16, 2020, issued in counterpart application No. EP 17899019.8. (14 pages).

International Search Report dated Apr. 25, 2017, issued in counterpart International Application No. PCT/JP2017/008449, with English Translation. (2 page).

* cited by examiner

DISPLAY CONTROL APPARATUS, DISPLAY CONTROL METHOD, AND STORAGE MEDIUM

CROSS-REFERENCE TO RELATED APPLICATION

This application is a continuation of International Patent Application No. PCT/JP2017/008449 filed on Mar. 3, 2017, the entire disclosures of which is incorporated herein by reference.

TECHNICAL FIELD

The present invention relates to a display control apparatus, a display control method, and a storage medium.

BACKGROUND ART

An automatic working machine is known that performs lawn mowing by autonomously travelling in a work area that is defined by an area wire. Japanese Patent Laid-Open No. 2016-186748 describes a technology in which a user can confirm a work area map created by an automatic working machine using an external device.

SUMMARY OF INVENTION

Technical Problem

It is possible to confirm a work area map created by an automatic working machine with the technology described in Japanese Patent Laid-Open No. 2016-186748. However, it has been difficult for a user to intuitively understand the state of the automatic working machine. One aspect of the present invention allows a user to intuitively understand the state of the automatic working machine.

Solution to Problem

According to some embodiments of the present invention, a non-transitory storage medium storing a program is provided, the program including instructions for causing, when executed by at least one processor, the at least one processor to execute: acquiring a state of an automatic working machine; displaying an image illustrating the automatic working machine in a display apparatus in a size in accordance with the state; and causing the display apparatus to display, with the image, an interface for controlling a start of a work of the automatic working machine.

DESCRIPTION OF EMBODIMENTS

Embodiments of the present invention will be described with reference to the accompanying drawings. The same reference signs are given to similar elements throughout the various embodiments, and redundant description will be omitted. Also, the embodiments can be changed or combined as appropriate. Some embodiments of the present invention relate to an automatic working machine. The automatic working machine refers to an apparatus that performs work without requiring real-time instructions from a user. The automatic working machine may perform work in accordance with a predetermined procedure. The automatic working machine may be an autonomously travelling type. This type of the automatic working machine may also be referred to as an unmanned working vehicle. In the following, a mobile lawnmower that performs lawn mowing work will be described as an example of the unmanned working vehicle.

Figure 1:
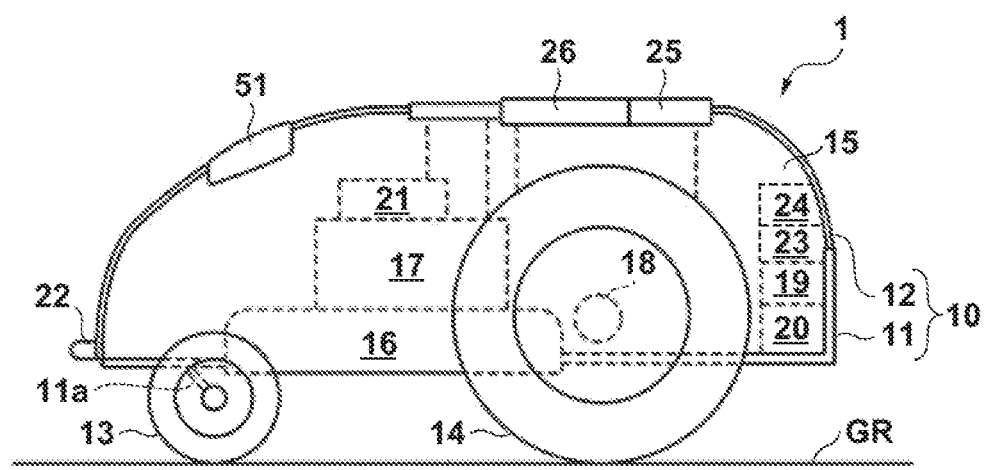
FIG. 1 is a side view schematically illustrating a configuration of a working machine according to an embodiment of the present invention.
Figure 2:
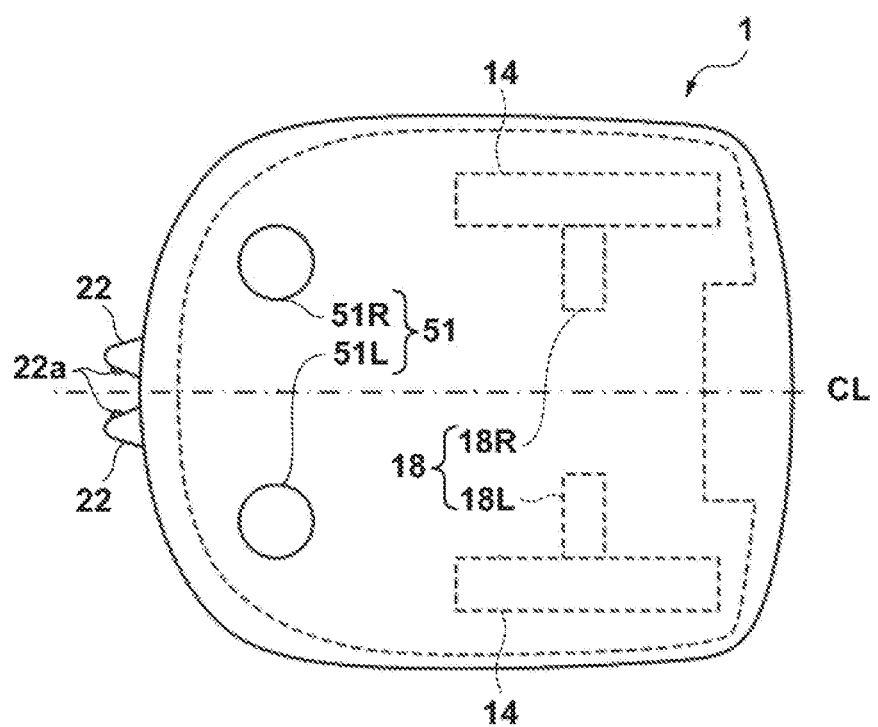
FIG. 2 is a plan view schematically illustrating the configuration of the working machine according to the embodiment of the present invention.

FIG. 1 is a side view schematically illustrating a configuration of an automatic working machine (hereinafter, simply referred to as a working machine) according to some embodiments, and FIG. 2 is a plan view. In the following, the rectilinear direction (length direction) and the vehicle width direction perpendicular to the rectilinear direction of the working machine in planer view are respectively defined as a front-and-rear direction and a left-and-right direction, the height direction of the working machine is defined as an up-and-down direction, and the configuration of the units will be described in accordance with this definition.

As shown in FIGS. 1 and 2, a working machine 1 includes a vehicle body 10 having a chassis 11 and a frame 12, and a left-and-right pair of front wheels 13 and a left-and-right pair of rear wheels 14 that support the vehicle body 10 from a ground plane GR such that the working machine 1 can travel. The front wheels 13 are rotatably attached to a front side of the chassis 11 via stays 11a. The rear wheels 14 have a larger diameter than the front wheels 13, and are rotatably attached directly to a rear side of the chassis 11. An input apparatus 25 and a display apparatus 26 are installed on an upper surface of the frame 12. The working machine 1 has a weight and a size that allows users to carry the working machine 1 by themselves. The total length (length in the front-and-rear direction), the total width, and the height of the working machine 1 are respectively about 500 mm, about 300 mm, and about 300 mm, for example.

The input apparatus 25 is an apparatus for receiving an input operation made by the user, and includes a numerical keyboard, cursor keys, switches and the like. The switches include a main switch for instructing to start operations of the working machine 1 and an emergency stop switch for instructing an emergency stop, for example. The display apparatus 26 is an apparatus for providing various types of information to the user. The user can inputs various instructions via the input apparatus 25 (numerical keyboard, cursor keys) while viewing information displayed on the display apparatus 26. The input apparatus 25 and the display apparatus 26 can be constituted by a touch screen.

In an interior space 15 of the working machine 1 that is surrounded by the chassis 11 and the frame 12, a working apparatus 16, a working motor 17 for driving the working machine, a traveling motor 18 for driving rear wheels, a charging unit 19, a battery 20, a control apparatus 23, and a communication apparatus 24 are arranged.

The working apparatus 16 includes a rotator and a lawn-mowing blade attached to the rotator, and has a substantially disc shape as a whole. The working apparatus 16 is configured such that a rotating shaft at the center of the rotator is arranged along an up-and-down direction, and the height of the blade from the ground plane GR can be adjusted by a height adjustment mechanism 21. The height adjustment mechanism 21 includes a screw that can be operated by the user, for example. The working motor 17 is constituted by a motor that is arranged above the working apparatus 16, the output shaft thereof being coupled to the rotating shaft of the rotator, and rotationally drives the blade integrally with the rotator.

The traveling motor 18 is constituted by a pair of traveling motors 18L and 18R that are respectively arranged inside, in the left and right direction, of the left and right rear wheels 14. The output shafts of the traveling motors 18L and 18R are respectively coupled to the rotating shafts of the left and right rear wheels 14, and the traveling motors 18L and 18R independently rotationally drive the left and right rear wheels 14. That is, the working machine 1 is configured such that the front wheels 13 are driven wheels and the rear wheels 14 are driving wheels, and the traveling motors 18L and 18R independently rotationally drive the left and right rear wheels 14 in a normal direction (rotation in a forward direction) or in a reverse direction (rotation in a backward direction). As a result of causing a speed difference in rotation between the left and right rear wheels 14, the working machine 1 can turn at any angle.

For example, when the left and right rear wheels 14 are rotated in a normal direction, if the rotational speed of the right rear wheel 14 is higher than the rotational speed of the left rear wheel 14, the working machine 1 turns left at a turning angle in accordance with the speed difference. On the other hand, if the rotational speed of the left rear wheel 14 is higher than the rotational speed of the right rear wheel 14, the working machine 1 turns right at a turning angle in accordance with the speed difference. If one of the left and right rear wheels 14 is rotated in a normal direction, and the other is rotated in a reverse direction at the same speed, the working machine 1 turns on the spot.

The charging unit 19 includes an AC/DC converter, and is connected to terminals 22 provided in a front end portion of the frame 12 via wiring, and is also connected to the battery 20 via wiring. The terminals 22 have contacts 22a, and as a result of the terminals 22 being connected to a charging station 3 (refer to FIG. 4) via the contacts 22a, the battery 20 can be charged. The battery 20 is connected to the working motor 17 and the traveling motor 18 via wiring, and the working motor 17 and the traveling motor 18 are driven with power supplied from the battery 20 via drivers. Also, power is also supplied to the control apparatus 23, the communication apparatus 24, the input apparatus 25, and the display apparatus 26 from the battery 20.

A pair of magnetic sensors 51 (magnetic sensors 51L and 51R) are arranged in a front portion of the working machine 1 so as to be separated in the left-and-right direction. Specifically, as shown in FIG. 2, the pair of magnetic sensors 51L and 51R are arranged symmetrically in the left-right direction relative to a central line CL that passes through the center of the working machine 1 in the vehicle width direction, along a rectilinear direction.

The working machine 1 includes a yaw sensor, a G sensor, a direction sensor, a GPS sensor, a contact sensor, a left-and-right pair of wheel speed sensors, and a voltage sensor, in addition to the magnetic sensor 51. The magnetic sensor outputs a signal indicating the magnitude of magnetic field (magnetic field strength). The yaw sensor is an angular velocity sensor that outputs a signal indicating the angular velocity (yaw rate) about an axis (Z axis) in the height direction of the working machine 1. The control apparatus 23 can detect the turning angle of the working machine 1 about the Z axis with the signal from the yaw sensor. The G sensor outputs a signal indicating the accelerations in three orthogonal axes (X axis, Y axis, Z axis) directions that act on the working machine 1. The direction sensor is a geomagnetic sensor having a two-axis or three-axis structure that outputs a signal corresponding to the geomagnetism. The control apparatus 23 can detect the orientation of the working machine 1 relative to a predetermined direction (north, for example) with the signal from the direction sensor. The GPS sensor receives radio waves from GPS satellites, and detects the current position (latitude, longitude) of the working machine 1. The contact sensor outputs an ON signal when the working machine 1 approaches or comes in contact with an obstacle. The wheel speed sensors respectively output signals indicating the wheel speeds of the left and right rear wheels 14. The control apparatus 23 can calculate the traveling distance of the working machine 1 with the signals from the wheel speed sensors. The voltage sensor detects the residual voltage of the battery 20.

The communication apparatus 24 is an apparatus for communicating with an apparatus external to the working machine 1, and is constituted by a transmitting and receiving antenna and a signal processing circuit for processing signals that are to be transmitted and have received via the transmitting and receiving antenna, for example. The communication apparatus 24 may conform to a near field communication technology such as a wireless LAN or Bluetooth, or may conform to a mobile communication technology such as 3G or LTE.

Figure 3:
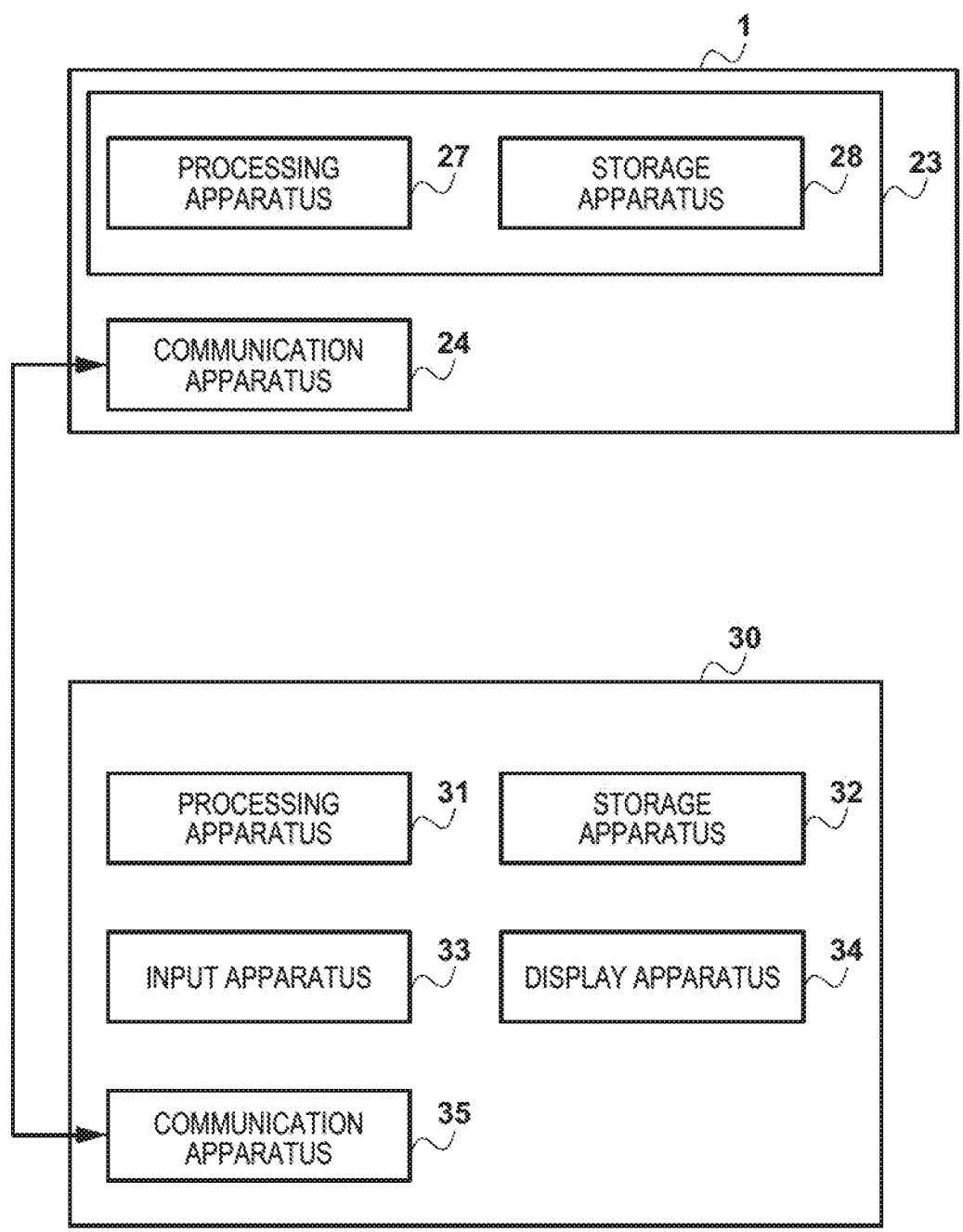
FIG. 3 is a block diagram illustrating a configuration of a control apparatus and an information processing apparatus of the working machine according to the embodiment of the present invention.

The control apparatus 23 is an apparatus for controlling overall operations of the working machine 1, and is a microcomputer such as an ECU (electronic control unit), for example. The working machine 1 can communicate with an information processing apparatus 30 that is external to the working machine 1. An exemplary configuration of the control apparatus 23 and the information processing apparatus 30 will be described with reference to FIG. 3. In FIG. 3, some constituent elements of the working machine 1 are omitted.

The control apparatus 23 includes a processing apparatus 27 and a storage apparatus 28. The processing apparatus 27 is an apparatus that executes processing to be performed by the control apparatus 23, and is constituted by a processor such as a CPU, for example. The storage apparatus 28 is an apparatus for storing data for processing to be performed by the control apparatus 23, and is constituted by a memory such as a RAM or a ROM. The storage apparatus 28 stores programs and data that define the operations of the working machine 1. The processing apparatus 27 updates data stored in the storage apparatus 28 based on a user input made through the input apparatus 25 or an input received from the information processing apparatus 30. Also, the processing apparatus 27 performs display control of the display apparatus 26 and operation control of the working motor 17 and the traveling motor 18 by executing instructions included in programs stored in the storage apparatus 28. When these types of control are executed, the processing apparatus 27 uses various types of data read out from the storage apparatus 28 and data acquired from the above-described various sensors that have been installed in the working machine 1.

The information processing apparatus 30 is an apparatus for the user of the working machine 1 to remotely control the working machine 1, and may be a mobile apparatus such as a mobile phone terminal, a smartphone, or a laptop computer, or may be a stationary apparatus such as a desktop computer. The information processing apparatus 30 includes a processing apparatus 31, a storage apparatus 32, an input apparatus 33, a display apparatus 34, and a communication apparatus 35.

The processing apparatus 31 is an apparatus for executing processing to be performed by the information processing apparatus 30, and is constituted by a processor such as a CPU, for example. The storage apparatus 32 is an apparatus for storing data for processing to be performed by the information processing apparatus 30, and is constituted by a memory such as a RAM or a ROM. The storage apparatus 32 stores programs and data that define the operations of the information processing apparatus 30. In some embodiments, the storage apparatus 32 stores programs as application programs. The processing apparatus 31 updates data stored in the storage apparatus 32 based on a user input made through the input apparatus 33 or an input received from the working machine 1. Also, the processing apparatus 31 performs display control of the display apparatus 34 and operation control of the working machine 1 by executing instructions included in programs stored in the storage apparatus 32.

The input apparatus 33 is an apparatus for accepting an input operation made by the user, and includes a touch panel, a keyboard, and the like. The display apparatus 34 is an apparatus for providing various types of information to the user. The user can input various instructions through the input apparatus 33 while viewing information displayed in the display apparatus 34. The input apparatus 33 and the display apparatus 34 can be constituted by a touch screen. The communication apparatus 35 is an apparatus for communicating with an apparatus external to the information processing apparatus 30, and is constituted by a transmitting and receiving antenna and a signal processing circuit for processing signals that are to be transmitted and have been received via the transmitting and receiving antenna, for example. The communication apparatus 35 may conform to a near field communication technology such as a wireless LAN or Bluetooth, or may conform to a mobile communication technology such as 3G or LTE.

Figure 4:
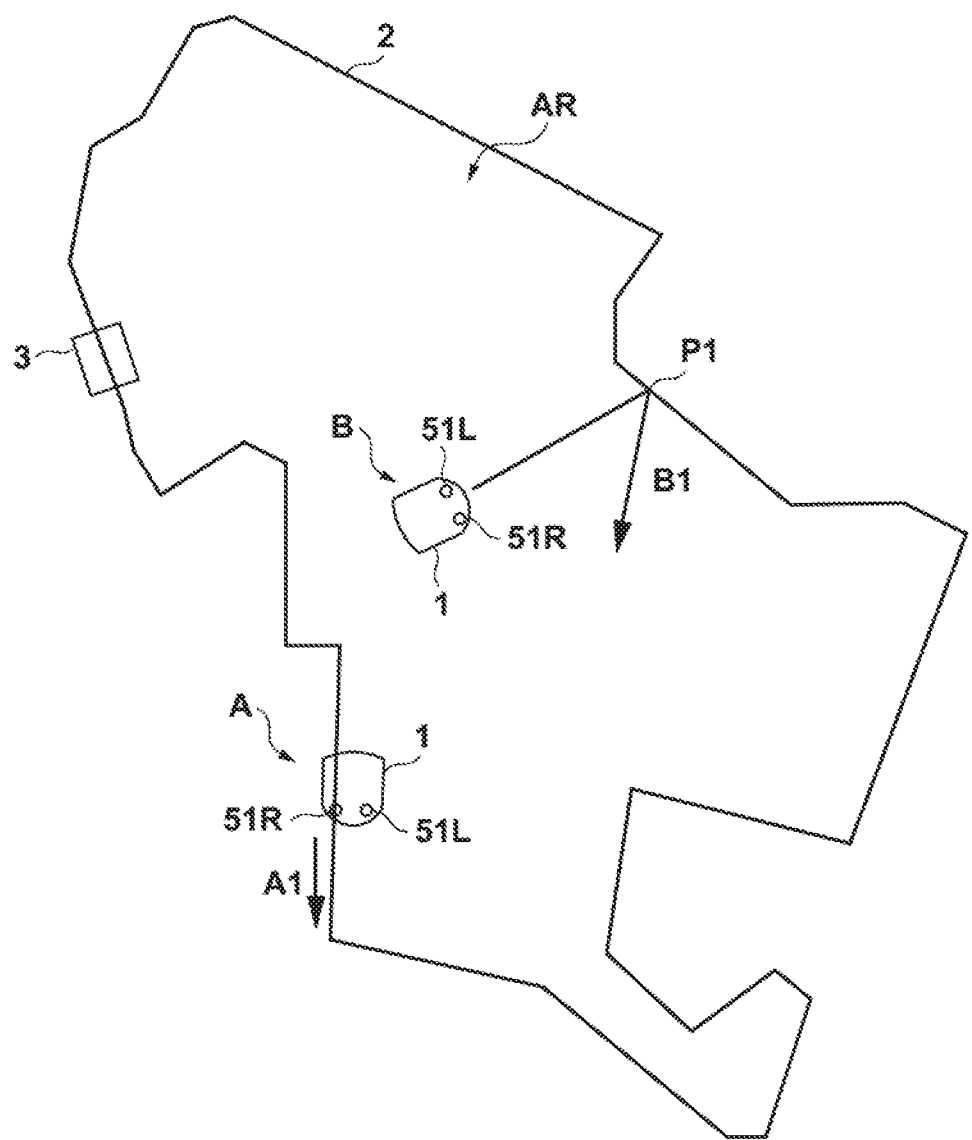
FIG. 4 is a diagram illustrating an example of a work area in which work is performed by the working machine according to the embodiment of the present invention.

The working machine 1 configured as described above performs work while autonomously traveling inside a predetermined work area. FIG. 4 is a diagram illustrating an example of a work area AR. The work area AR is demarcated by an area wire 2 that has been laid in advance (buried in a predetermined depth from a ground plane GR, in advance), for example. The area wire 2 is laid such that a building on the site and an obstacle are not included, for example. A current is supplied to the area wire 2, and a magnetic field is generated due to this current in the work area AR. Note that, the charging station 3 is arranged on the area wire 2 for charging the battery 20. The work area AR defines the traveling range of the working machine 1, and may include a region in which the work is not to be performed, in addition to the region in which the work is to be performed.

Figure 5:
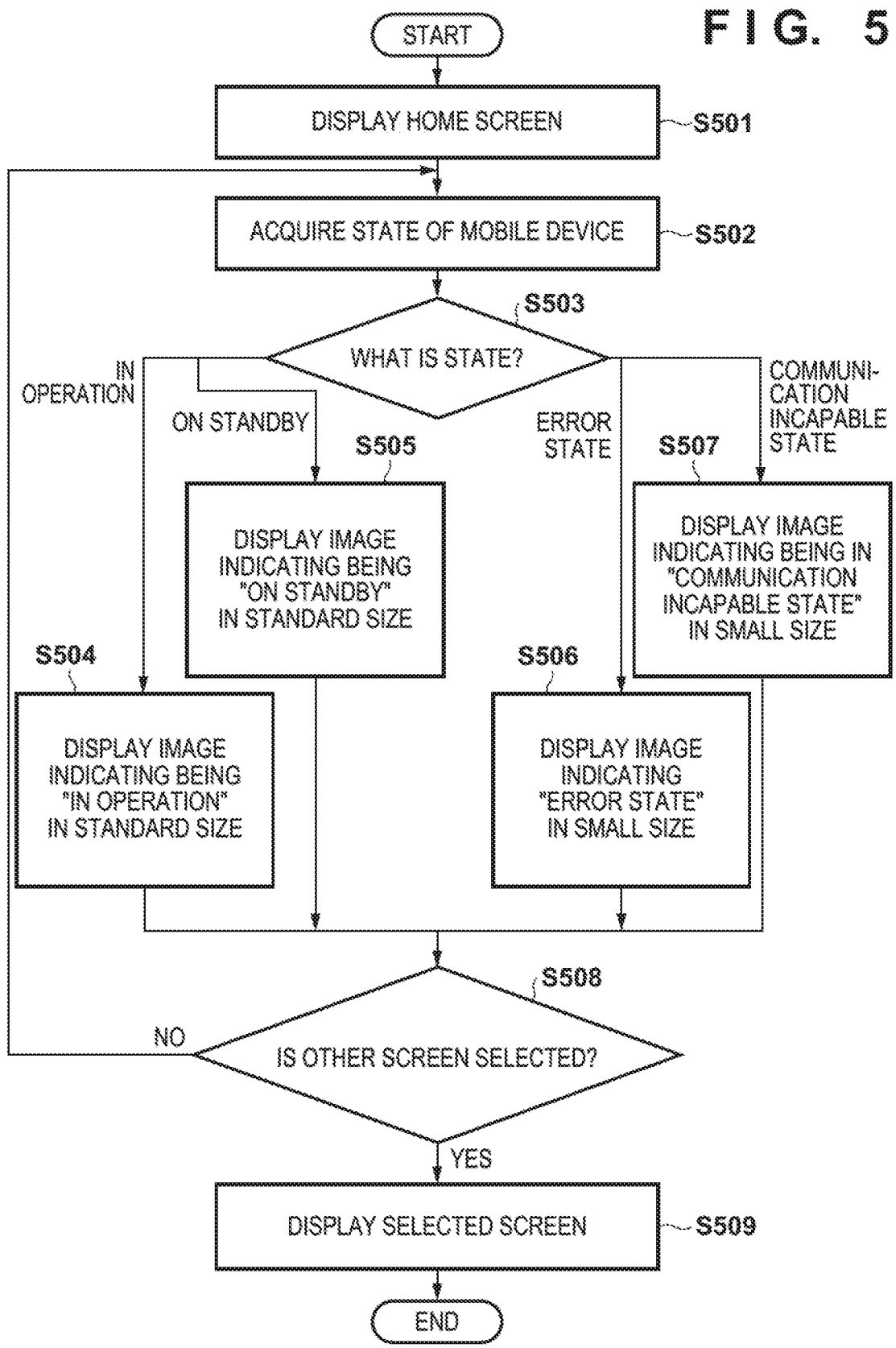
FIG. 5 is a flow diagram illustrating an example of operations of the information processing apparatus according to the embodiment of the present invention.

Next, the display control method to be executed by the processing apparatus 31 of the information processing apparatus 30 will be described with reference to the flowchart in FIG. 5. This method is performed by the processing apparatus 31 reading out a program (application program, for example) stored in the storage apparatus 32, and executing instructions included in the program. That is, when this method is executed, the information processing apparatus 30 functions as a display control apparatus. This method is started when the user of the information processing apparatus 30 starts an application program, for example.

Figure 6:
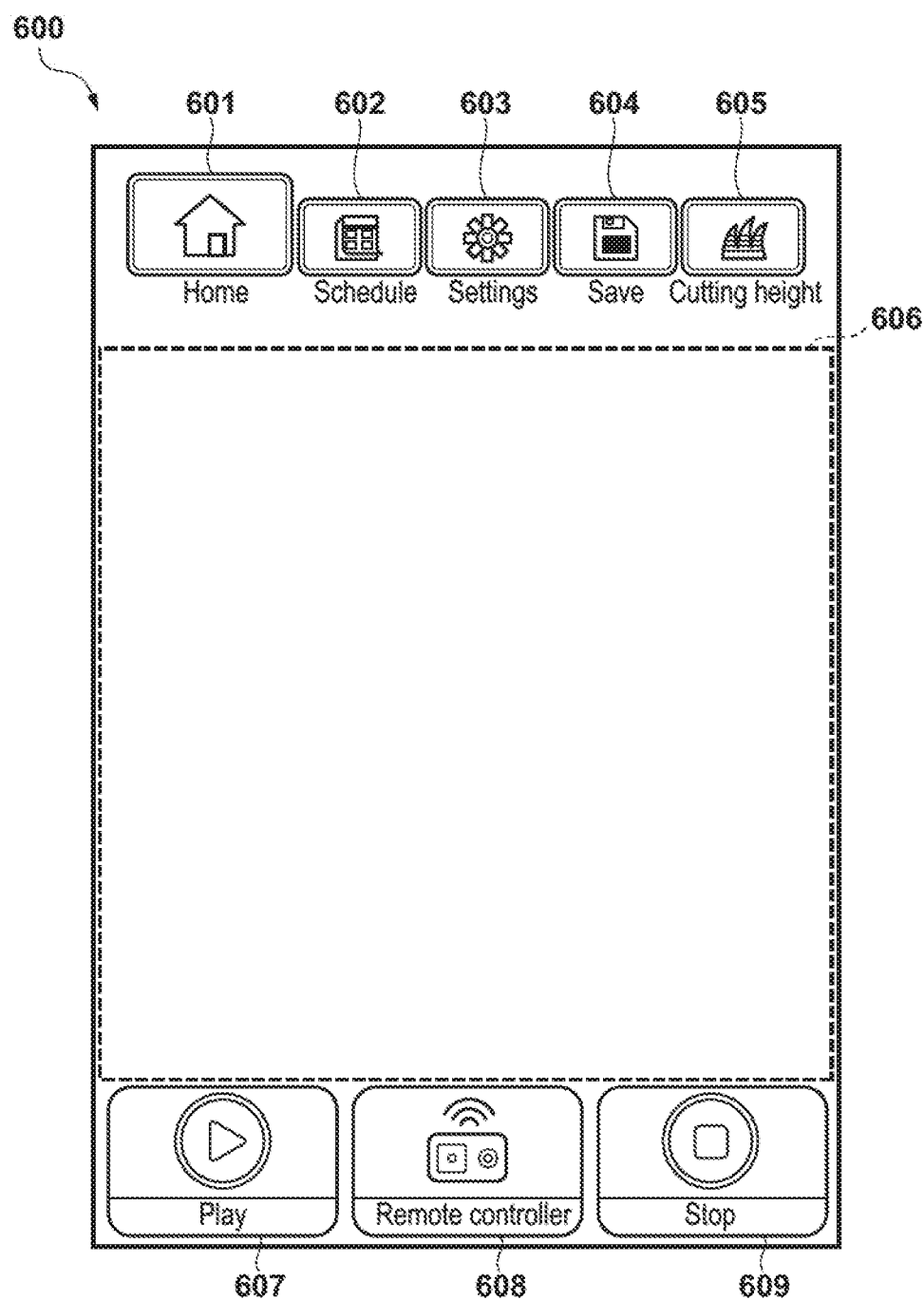
FIG. 6 is a diagram illustrating an exemplary display screen of the information processing apparatus according to the embodiment of the present invention.

In step S501, the processing apparatus 31 generates a home screen of the application, and displays the home screen on the display apparatus 34. The home screen is a screen for visually illustrating the state of the working machine 1. FIG. 6 shows a home screen 600, which is an example of the home screen. Five buttons for switching the screen are arranged side by side on an upper side of the home screen 600. A button 601 is for displaying the home screen. The button 601 is displayed in a larger size than those of other buttons 602 to 605 in order to indicate that the currently selected screen is the home screen.

The button 602 is for displaying a schedule setting screen. The user can set a work schedule of the working machine 1 on the schedule setting screen. The button 603 is a button for displaying a setting screen. The user can change settings regarding an application on the setting screen. The button 604 is a button for saving the current schedule setting and other settings in the storage apparatus 32. The button 605 is a button for displaying a screen for setting a cutting height of the lawn.

The home screen 600 includes an image display region 606 at the center thereof. As will be described later, the state of the working machine 1 is displayed as an image in the image display region 606. Three buttons for the user to directly operate the working machine 1 are arranged side by side on a lower side of the home screen 600. A button 607 is a button for causing the working machine 1 on standby to start work. A button 608 is a button for opening a screen on which the user directly controls the travelling of the working machine 1. A button 609 is a button for causing the working machine 1 in operation to stop the work.

Returning to FIG. 5, in step S502, the processing apparatus 31 acquires the state of the working machine 1. The state of the working machine 1 includes an operating state (such as being in operation or on standby, for example) of the working machine 1, information indicating whether or not an error has occurred in the working machine 1, a communication condition between the working machine 1 and the information processing apparatus 30, and the remaining amount of the battery 20, for example. In step S503, the processing apparatus 31 determines the state of the working machine 1. For example, the processing apparatus 31 transmits a request for requesting transmission of information regarding the operating state of the working machine 1, whether or not an error has occurred, and the remaining amount of the battery 20, to the working machine 1. If a response from the working machine 1 has not been received within a predetermined time, the processing apparatus 31 determines that the state of the working machine 1 is a "communication incapable state". If a response from the working machine 1 has been received within the predetermined time, the processing apparatus 31 determines that the state of the working machine 1 is one of "in operation", "on standby", and an "error state" based on the contents of communication from the working machine 1.

Figure 7:
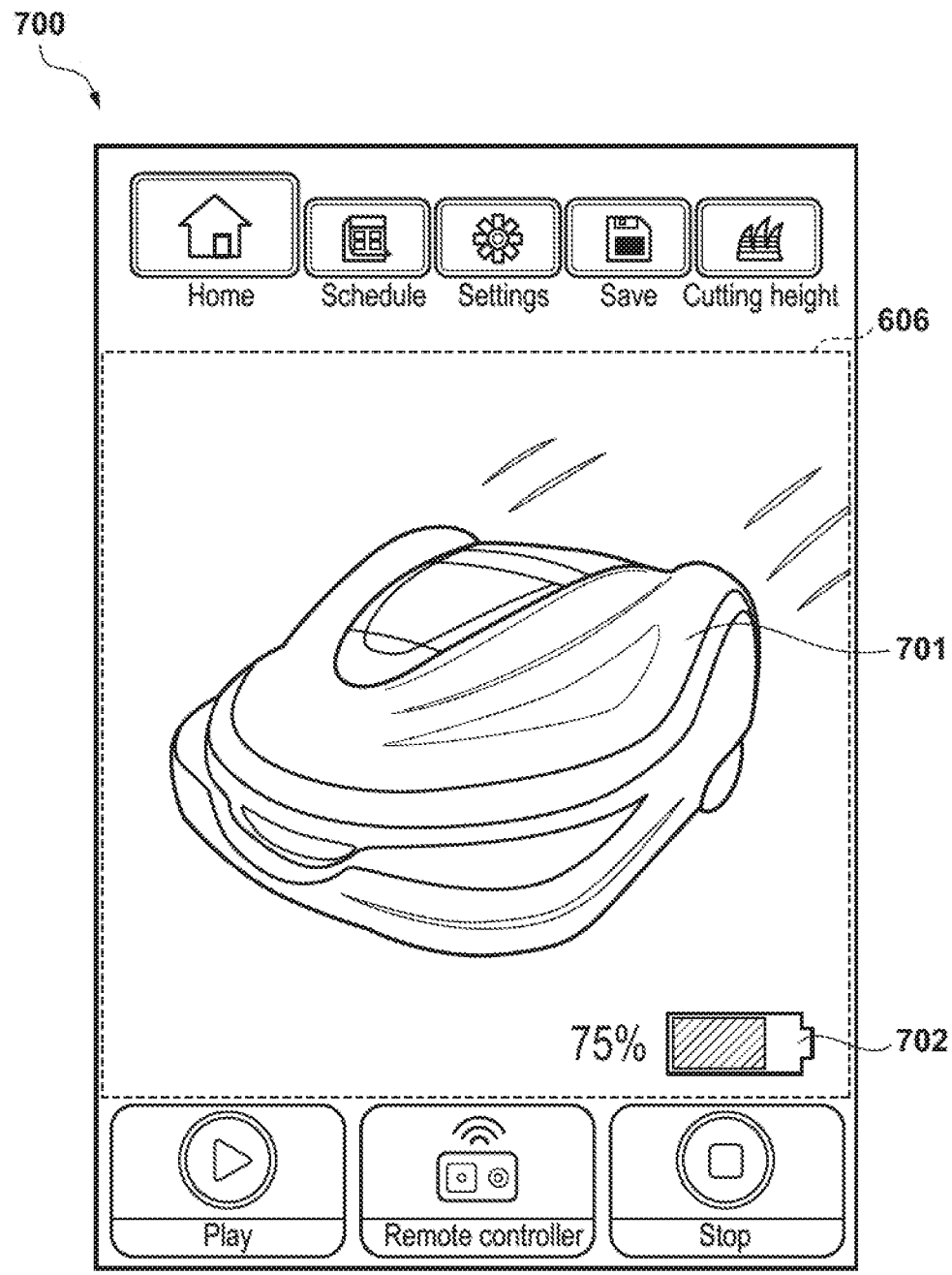
FIG. 7 is a diagram illustrating an exemplary display screen of the information processing apparatus according to the embodiment of the present invention.

When the state of the working machine 1 is "in operation", in step S504, the processing apparatus 31 updates the home screen that is currently displayed on the display apparatus 34 so as to display an image indicating being "in operation" in a standard size. FIG. 7 shows a home screen 700, which is an example of the home screen in the case of being "in operation". An image 701 illustrating the working machine 1 is displayed in the image display region 606 of the home screen 700. The image 701 is an image in which the external appearance of the working machine 1 is illustrated in a form indicating that the working machine 1 is in operation, in a standard size. The image 701 may also be displayed as an animation for indicating that the working machine 1 is in operation. An image 702 indicating the remaining amount of the battery 20 is also displayed in the image display region 606.

Figure 8:
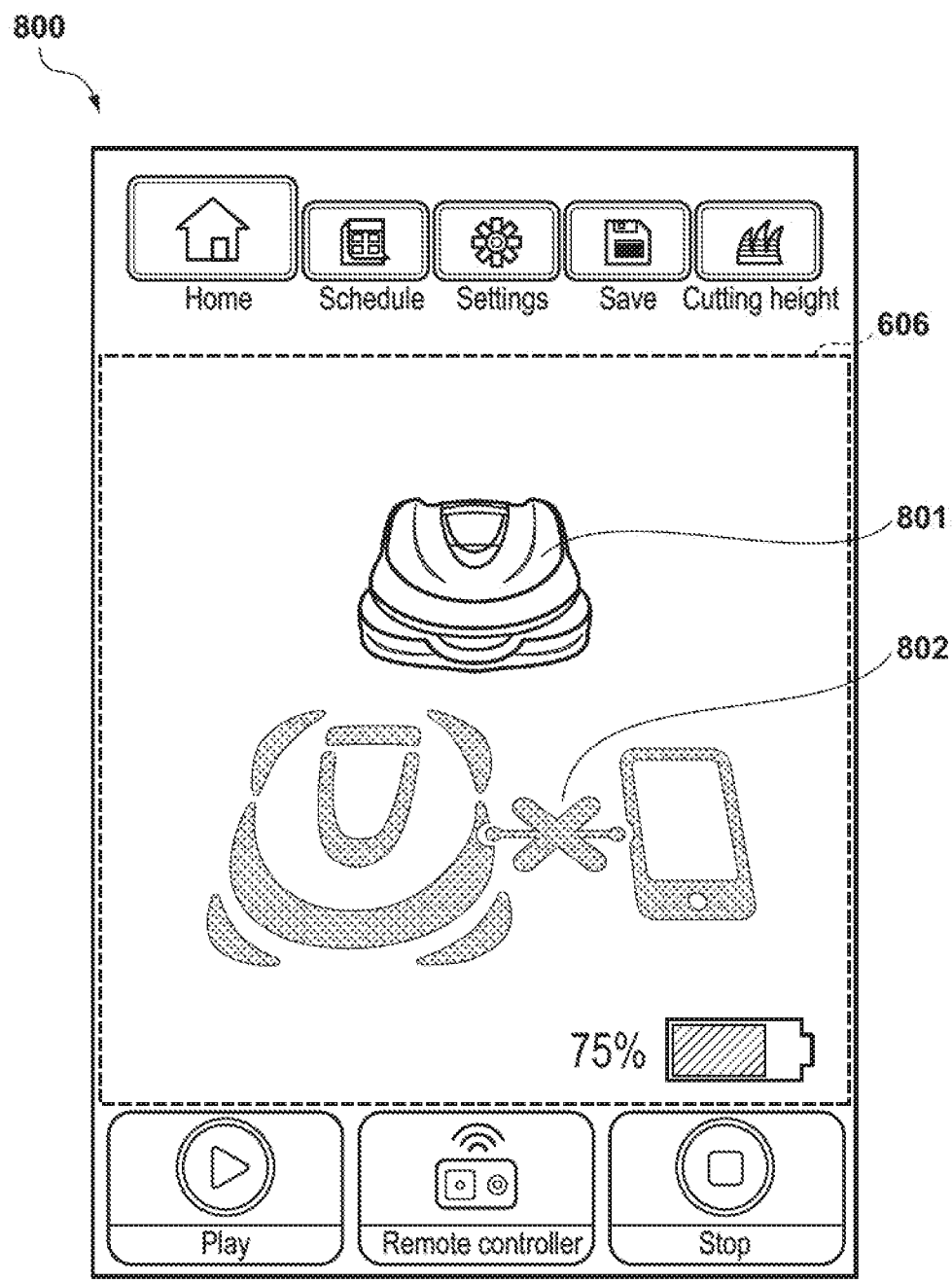
FIG. 8 is a diagram illustrating an exemplary display screen of the information processing apparatus according to the embodiment of the present invention.

When the state of the working machine 1 is "on standby", in step S505, the processing apparatus 31 updates the home screen that is currently displayed on the display apparatus 34 so as to display an image indicating being "on standby" in a standard size. When the state of the working machine 1 is an "error state", in step S506, the processing apparatus 31 updates the home screen that is currently displayed in the display apparatus 34 so as to display an image indicating an "error state" in a small size. When the state of the working machine 1 is a "communication incapable state", in step S507, the processing apparatus 31 updates the home screen that is currently displayed in the display apparatus 34 so as to display an image indicating a "communication incapable state" in a small size. FIG. 8 shows a home screen 800, which is an example of the home screen in the case of a "communication incapable state". An image 801 illustrating the working machine 1 and an image 802 illustrating that the working machine 1 and the information processing apparatus 30 cannot communicate with each other are displayed in the image display region 606 of the home screen 800. The image 801 is an image in which the external appearance of the working machine 1 is illustrated in a form indicating that communication is impossible, in a small size.

In the present embodiment, the small size used in steps S506 and S507 is a size that is smaller than the standard size. For example, the small size may be 20% to 80% of the standard size, and may be half (50%). As a result of displaying the image illustrating the working machine 1 in the small size when the working machine 1 does not properly operate as in an "error state" or when the state of the working machine 1 cannot be appropriately acquired as in a "communication incapable state", the user of the information processing apparatus 30 can intuitively understand such a state.

Returning to FIG. 5, in step S508, the processing apparatus 31 determines whether or not displaying of a screen other than the home screen has been selected by the user. If displaying of a screen other than the home screen has been selected by the user ("YES" in step S508), in step S509, the processing apparatus 31 displays the selected screen. If displaying of a screen other than the home screen has not been selected by the user ("NO" in step S508), the processing apparatus 31 returns the processing to step S502, and updates the home screen again.

Figure 9:
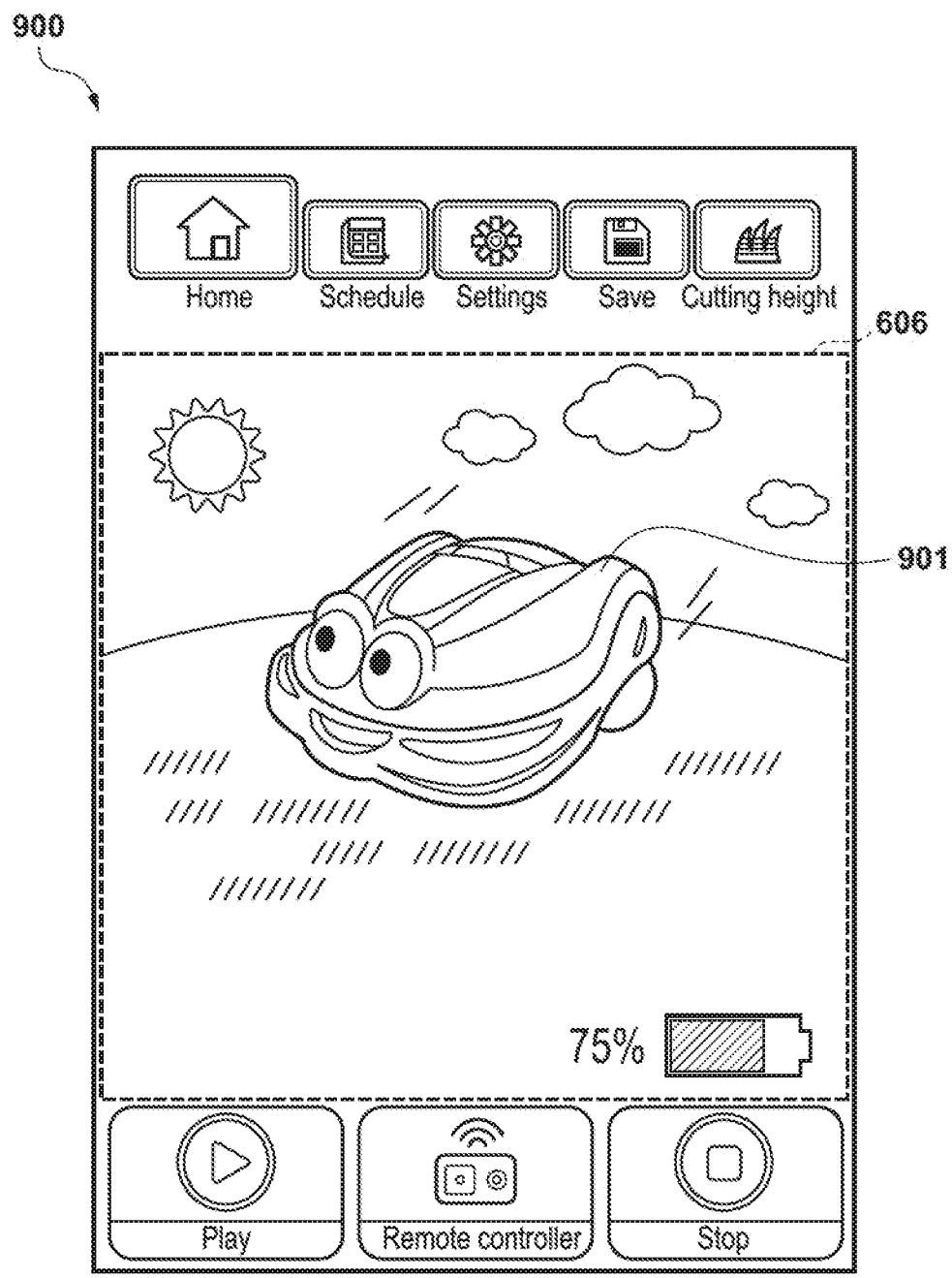
FIG. 9 is a diagram illustrating an exemplary display screen of the information processing apparatus according to the embodiment of the present invention.
Figure 10:
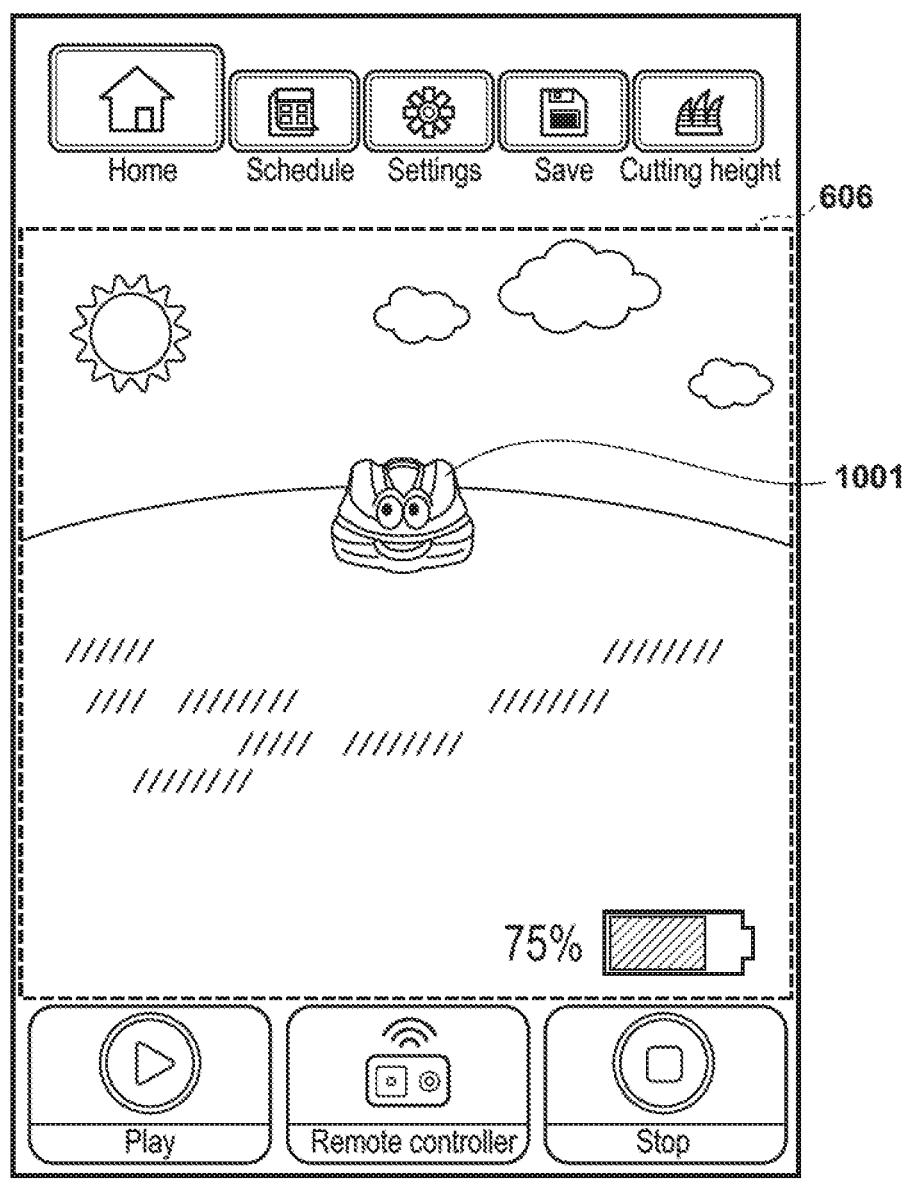
FIG. 10 is a diagram illustrating an exemplary display screen of the information processing apparatus according to the embodiment of the present invention.
Figure 11:
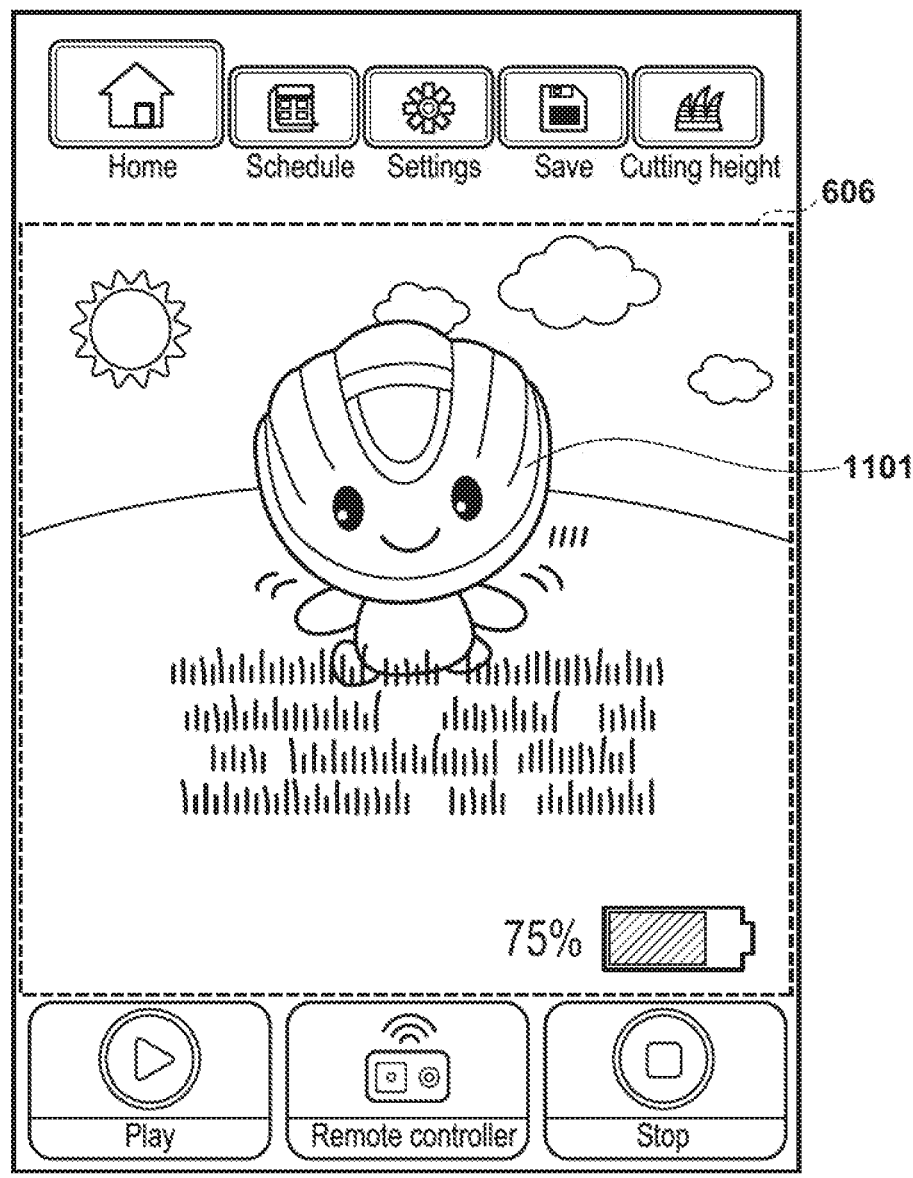
FIG. 11 is a diagram illustrating an exemplary display screen of the information processing apparatus according to the embodiment of the present invention.
Figure 12:
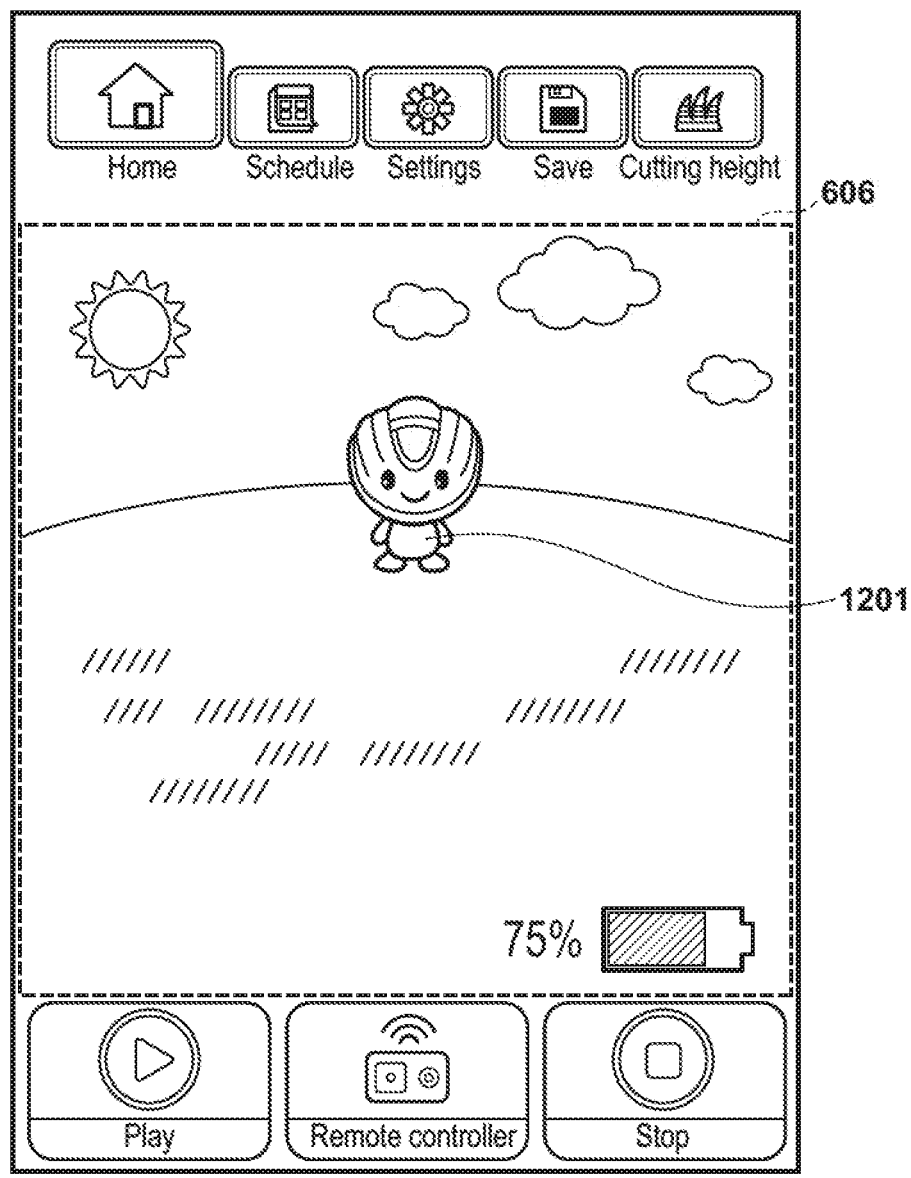
FIG. 12 is a diagram illustrating an exemplary display screen of the information processing apparatus according to the embodiment of the present invention.

Modifications of the home screen displayed in steps S504 and S507 described above will be described with reference to FIGS. 9 to 12. In a first modification, a home screen 900 shown in FIG. 9 is displayed in step S504, and a home screen 1000 shown in FIG. 10 is displayed in step S507. An image 901, in the home screen 900, illustrating the working machine 1 and an image 1001, in the home screen 1000, illustrating the working machine 1 are images obtained by deforming the external appearance of the working machine 1. In a second modification, a home screen 1100 shown in FIG. 11 is displayed in step S504, and a home screen 1200 shown in FIG. 12 is displayed in step S507. An image 1101, in the home screen 1100, illustrating the working machine 1 and an image 1201, in the home screen 1200, illustrating the working machine 1 are character images using the external appearance of the working machine 1 as a motif.

Figure 13:
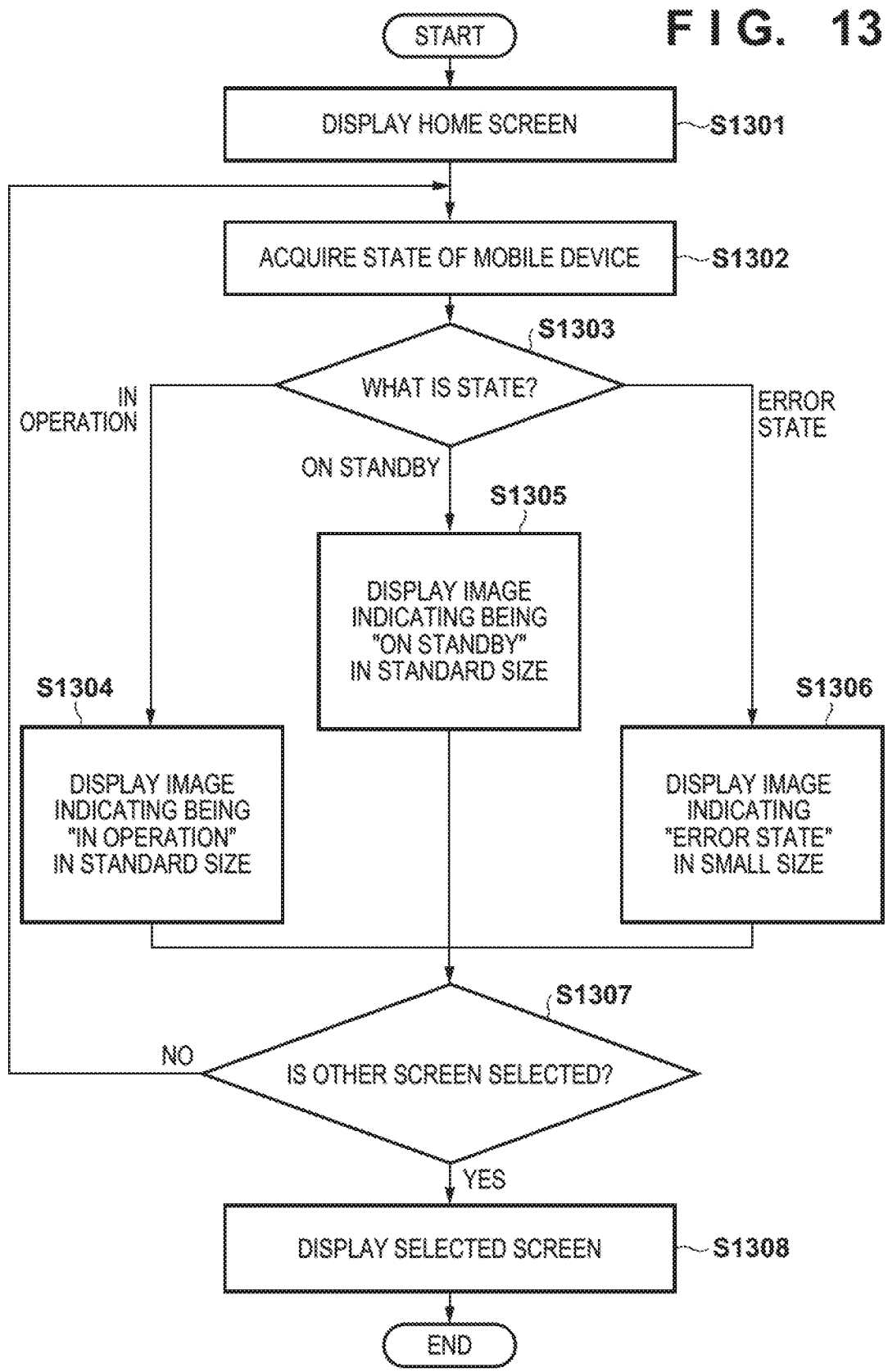
FIG. 13 is a flow diagram illustrating an example of operations of the working machine according to the embodiment of the present invention.

Next, the display control method to be executed by the processing apparatus 27 of the working machine 1 will be described with reference to the flowchart in FIG. 13. This method is implemented by the processing apparatus 27 reading out a program stored in the storage apparatus 28 and executing instructions included in the program. That is, when this method is executed, the control apparatus 23 functions as a display control apparatus. This method is started when a power supply of the working machine 1 is turned on, for example.

In S1301, the processing apparatus 27 displays the home screen in the display apparatus 26 similarly to step S501. The home screen may be the same as the home screen 600 in FIG. 6, or may include only the image display region 606 of the home screen 600.

In step S1302, the processing apparatus 27 acquires the state of the working machine 1. The state of the working machine 1 includes an operating state (such as being in operation or on standby, for example) of the working machine 1, information indicating whether or not an error has occurred in the working machine 1, and the remaining amount of the battery 20, for example. In step S1303, the processing apparatus 31 determines the state of the working machine 1. The processing apparatus 31 determines that the state of the working machine 1 is one of "in operation", "on standby", and an "error state" based on data from the various sensors of the working machine 1 and data stored in the storage apparatus 28.

The processing apparatus 31 updates the home screen that is currently displayed in the display apparatus 26 in steps S1304 to S1306, similarly to steps S504 to S506. Thereafter, the processing apparatus 31 performs processing in steps S1307 and S1308 that is similar to that in steps S508 and S509. As a result of displaying the image indicating the working machine 1 in the small size when the working machine 1 does not properly operate as in an "error state", the user of the working machine 1 can intuitively understand such a state by viewing the display apparatus 26 of the working machine 1.

SUMMARY OF EMBODIMENTS

Configuration 1

A storage medium (28, 32) storing a program, the program including instructions for causing, when executed by at least one processor (27, 31), the at least one processor to execute:

acquiring a state of an automatic working machine (1); and displaying an image (701, 801, 901, 1001, 1101, 1201) illustrating the automatic working machine in a display apparatus (26, 34) in a size in accordance with the state.

According to this configuration, a user can intuitively understand the state of the automatic working machine.

Configuration 2

The storage medium according to Configuration 1, where the at least one processor and the display apparatus are installed in an information processing apparatus (1) that can communicate with the automatic working machine, and the state of the automatic working machine includes a communication condition between the automatic working machine and the information processing apparatus.

According to this configuration, the user can intuitively understand the state of the automatic working machine using the information processing apparatus.

Configuration 3

The storage medium according to Configuration 2, wherein the size of the image when the automatic working machine and the information processing apparatus cannot communicate with each other is smaller than the size of the image when the automatic working machine and the information processing apparatus can communicate with each other.

According to this configuration, the user can intuitively understand the case where the automatic working machine and the information processing apparatus cannot communicate with each other.

Configuration 4

The storage medium according to any one of Configurations 1 to 3, wherein the size of the image when an error occurs in the automatic working machine is smaller than the size when the automatic working machine is in operation.

According to this configuration, the user can intuitively understand the case where an error occurs in the automatic working machine.

Configuration 5

A display control apparatus (23, 30) comprising:
at least one processor (27, 31),
a memory (28, 32), and
at least one program,
the at least one program being stored in the memory, and being configured to be executed by the at least one processor,
wherein the at least one program includes instructions for executing:

acquiring a state of an automatic working machine (1); and displaying an image illustrating the automatic working machine in a display apparatus in a size in accordance with the state.

According to this configuration, the user can intuitively understand the state of the automatic working machine.

Configuration 6

A method comprising:
in a display control apparatus (23, 30),
acquiring a state of an automatic working machine (1); and displaying an image illustrating the automatic working machine in a display apparatus (26, 34) in a size in accordance with the state.

According to this configuration, the user can intuitively understand the state of the automatic working machine.

The present invention is not intended to be restricted to the above embodiments, and various changes and modifications can be made without departing from the spirit or scope of the invention. Accordingly, the following claims are appended in order to disclose the scope of the invention.

The invention claimed is:

1. A system comprising:
at least one processor,
a memory, and
at least one program, the at least one program being stored in the memory, and being configured to be executed by the at least one processor, wherein the at least one program includes instructions for executing:
acquiring a state of an automatic working machine;
displaying an image illustrating the automatic working machine in a display apparatus in a size in accordance with the state; and
causing the display apparatus to display, with the image, an interface for controlling a start of a work of the automatic working machine, wherein
the at least one processor and the display apparatus are installed in an information processing apparatus that can communicate with the automatic working machine, and
the size of the image is in a standard size when the automatic working machine is in operation and on standby.

2. The system according to claim 1, the state of the automatic working machine includes a communication condition between the automatic working machine and the information processing apparatus.

3. The system according to claim 2, wherein the size of the image when the automatic working machine and the information processing apparatus cannot communicate with each other is smaller than the size of the image when the automatic working machine and the information processing apparatus can communicate with each other.

4. The system according to claim 1, wherein the size of the image when an error occurs in the automatic working machine is smaller than the size when the automatic working machine is in operation.

5. The system according to claim 1, wherein the program further includes an instruction for causing the at least one processor to
cause the display apparatus to display, with the image, an interface by which the user controls a travel of the automatic working machine.

6. The system according to claim 1, wherein the automatic working machine is a lawnmower of an autonomously travelling type.

7. A non-transitory storage medium storing a program, the program including instructions for causing, when executed by at least one processor, the at least one processor to execute:
acquiring a state of an automatic working machine;
displaying an image illustrating the automatic working machine in a display apparatus in a size in accordance with the state, wherein
the at least one processor and the display apparatus are installed in an information processing apparatus that can communicate with the automatic working machine, and the size of the image when the automatic working machine and the information processing apparatus cannot communicate with each other is smaller than the size of the image when the automatic working machine and the information processing apparatus can communicate with each other.

8. A non-transitory storage medium storing a program, the program including instructions for causing, when executed by at least one processor, the at least one processor to execute:

acquiring a state of an automatic working machine;

displaying an image illustrating the automatic working machine in a display apparatus in a size in accordance with the state, wherein the at least one processor and the display apparatus are installed in an information processing apparatus that can communicate with the automatic working machine, and the size of the image when an error occurs in the automatic working machine is smaller than the size when the automatic working machine is in operation.

9. A method for controlling an automatic working machine, the method performed by a processor, in a display control apparatus, comprising:

acquiring a state of an automatic working machine;

displaying an image illustrating the automatic working machine in the display apparatus in a size in accordance with the state; and causing the display apparatus to display, with the image, an interface for controlling a start of a work of the automatic working machine, wherein the at least one processor and the display apparatus are installed in an information processing apparatus that can communicate with the automatic working machine, and the size of the image is in a standard size when the automatic working machine is in operation and on standby.

\* \* \* \* \*